US 6,697,729 B2

(12) United States Patent
Wright (10) Patent No.: US 6,697,729 B2
(45) Date of Patent: Feb. 24, 2004

(54) SYSTEM FOR ESTIMATING NOX CONTENT OF EXHAUST GAS PRODUCED BY AN INTERNAL COMBUSTION ENGINE

(75) Inventor: John F. Wright, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 115 days.

(21) Appl. No.: 10/118,416

(22) Filed: Apr. 8, 2002

(65) Prior Publication Data

US 2003/0191575 A1 Oct. 9, 2003

(51) Int. Cl.$^7$ ................ F02M 25/07; G06F 19/00; F02B 33/44
(52) U.S. Cl. ............... 701/104; 701/108; 123/568.21; 60/605.2
(58) Field of Search ................ 701/100, 101, 701/102, 103, 104, 105, 106, 108, 109; 123/478, 480, 568.12, 568.21, 568.25, 568.26; 60/599, 602, 605.2, 274, 276, 284, 285, 286; 73/23.2, 23.31, 23.32; 700/29, 30, 31, 266, 299

(56) References Cited

U.S. PATENT DOCUMENTS

| | | | |
|---|---|---|---|
| 4,188,190 A | 2/1980 | Muraki et al. ............. 422/111 |
| 5,172,550 A * | 12/1992 | Takeshima ................. 60/278 |
| 5,229,090 A | 7/1993 | Hofmann et al. ........... 423/235 |
| 5,303,168 A | 4/1994 | Cullen et al. .............. 700/299 |
| 5,386,373 A | 1/1995 | Keeler et al. .............. 700/266 |
| 5,505,174 A * | 4/1996 | Komoriya et al. .......... 123/478 |
| 5,539,638 A | 7/1996 | Keeler et al. ............... 60/274 |
| 5,548,528 A | 8/1996 | Keeler et al. ............... 700/30 |
| 5,584,172 A | 12/1996 | Oguchi et al. .............. 60/39.5 |
| 5,682,317 A | 10/1997 | Keeler et al. ............... 701/101 |
| 5,855,111 A | 1/1999 | Oguchi et al. .............. 60/39.5 |
| 6,006,586 A | 12/1999 | Yoshida et al. ............. 73/23.2 |
| 6,035,639 A * | 3/2000 | Kolmanovsky et al. ..... 60/605.2 |
| 6,236,908 B1 | 5/2001 | Cheng et al. ............... 701/106 |
| 6,311,679 B1 * | 11/2001 | Druzhinina et al. ... 123/568.21 |
| 6,321,157 B1 * | 11/2001 | Sun et al. .................. 701/103 |
| 6,401,457 B1 * | 6/2002 | Wang et al. ............... 60/605.2 |
| 6,513,484 B1 * | 2/2003 | Buckland et al. .......... 60/605.2 |
| 2002/0100463 A1 * | 8/2002 | Jaliwala et al. ............ 60/605.2 |

* cited by examiner

Primary Examiner—Willis R. Wolfe
(74) Attorney, Agent, or Firm—Barnes & Thornburg (57) ABSTRACT

A system for estimating NOx content of exhaust gas produced by an internal combustion engine includes a control computer operable to estimate an exhaust temperature corresponding to temperature of exhaust gas produced by the engine, to determine an EGR fraction corresponding to a fractional amount of recirculated exhaust gas present in an air charge supplied to the engine, and to estimate an emissions index, corresponding to a fuel rate normalized, mass-based NOx concentration of the exhaust gas produced by the engine, as a function of the exhaust temperature and the EGR fraction. The control computer is further operable to determine a mass flow rate of fresh air entering the intake manifold and a fuel mass flow rate, and estimate the NOx content by volume of the exhaust gas produced by the engine as a function of charge mass flow value, the fuel mass flow value and the emissions index value.

20 Claims, 3 Drawing Sheets

SYSTEM FOR ESTIMATING NOX CONTENT OF EXHAUST GAS PRODUCED BY AN INTERNAL COMBUSTION ENGINE

FIELD OF THE INVENTION

The present invention relates generally to systems for determining the NOx content of exhaust gas produced by an internal combustion engine, and more specifically to such systems for estimating NOx production as a function of one or more engine operating conditions.

BACKGROUND AND SUMMARY OF THE INVENTION

When combustion occurs in an environment with excess oxygen, peak combustion temperatures increase which leads to the formation of unwanted emissions, such as oxides of nitrogen ($NO_x$). This problem is aggravated through the use of turbocharger machinery operable to increase the mass of fresh air flow, and hence increase the concentrations of oxygen and nitrogen present in the combustion chamber when temperatures are high during or after the combustion event.

One known technique for reducing unwanted emissions such as $NO_x$ involves introducing chemically inert gases into the fresh air flow stream for subsequent combustion. By thusly reducing the oxygen concentration of the resulting charge to be combusted, the fuel burns slower and peak combustion temperatures are accordingly reduced, thereby lowering the production of $NO_x$. In an internal combustion engine environment, such chemically inert gases are readily abundant in the form of exhaust gases, and one known method for achieving the foregoing result is through the use of a so-called Exhaust Gas Recirculation (EGR) system operable to controllably introduce (i.e., recirculate) exhaust gas from the exhaust manifold into the fresh air stream flowing to the intake manifold valve, for controllably introducing exhaust gas to the intake manifold. Through the use of an on-board microprocessor, control of the EGR valve is typically accomplished as a function of information supplied by a number of engine operational sensors.

While EGR systems of the foregoing type are generally effective in reducing unwanted emissions resulting from the combustion process, a penalty is paid thereby in the form of a resulting loss in engine efficiency. A tradeoff thus exists in typical engine control strategies between the level of $NO_x$ production and engine operating efficiency, and difficulties associated with managing this tradeoff have been greatly exacerbated by the increasingly stringent requirements of government-mandated emission standards.

In order to achieve the dual, yet diametrically opposed, goals of limiting the production of $NO_x$ emissions to acceptably low levels while also maximizing engine operational efficiency under a variety of load conditions, substantial effort must be devoted to determining with a high degree of accuracy the correct proportions of air, fuel and exhaust gas making up the combustion charge. To this end, accurate, real-time values of a number of EGR system-related operating parameters must therefore be obtained, preferably at low cost. Control strategies must then be developed to make use of such information in accurately controlling the engine, EGR system and/or turbocharger. With such controls in place, it is further desirable to compute or estimate the amount of NOx being produced by the engine, both to monitor compliance with promulgated emissions standards and potentially as a control input to the air handling control system.

The present invention is accordingly directed to techniques for estimating in real-time the NOx production of an internal combustion engine.

These and other objects of the present invention will become more apparent from the following description of the preferred embodiments.

DESCRIPTION OF THE PREFERRED EMBODIMENTS

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Figure 1:
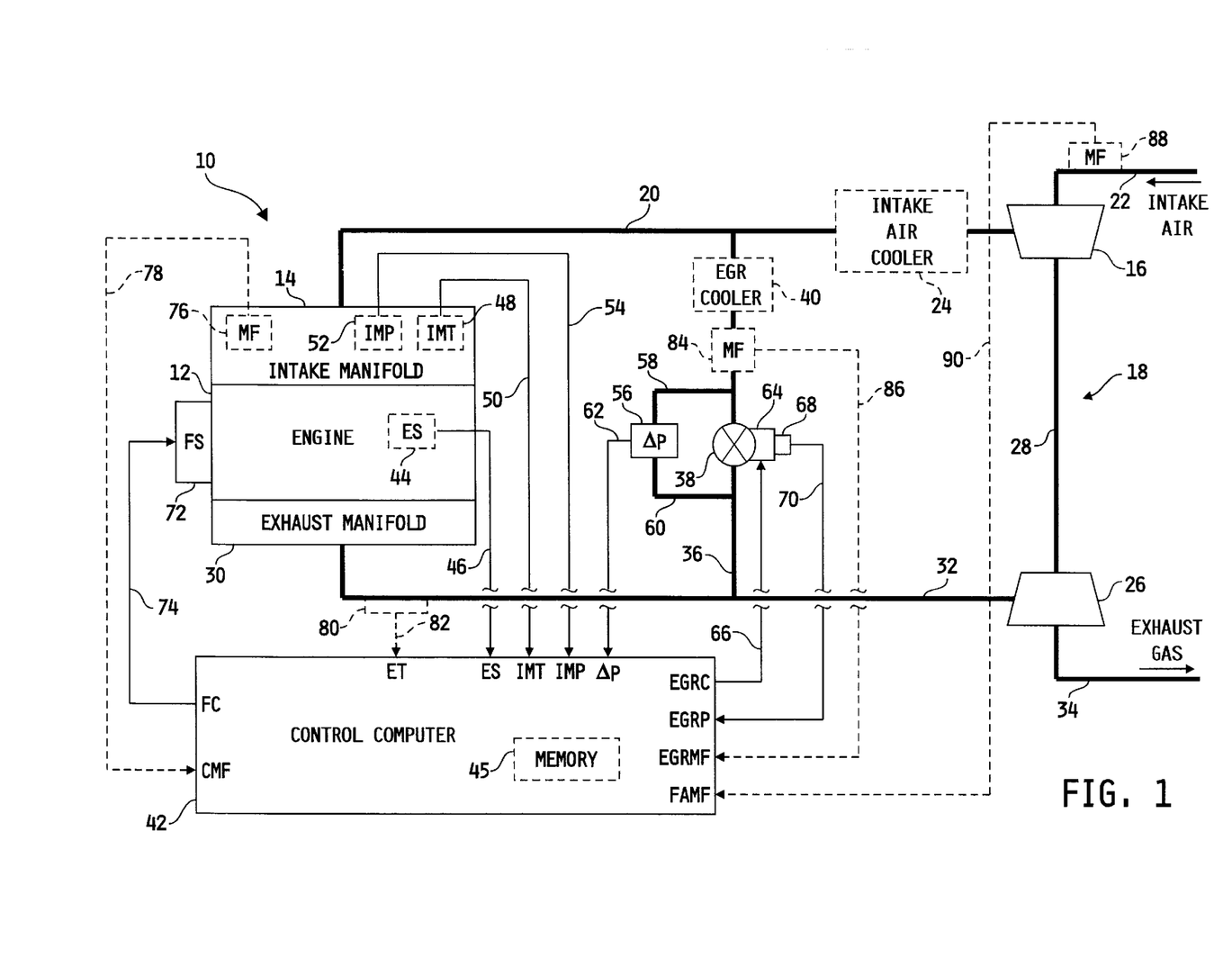
FIG. 1 is a diagrammatic illustration of one preferred embodiment of a system for estimating NOx content of exhaust gas produced by an internal combustion engine, in accordance with the present invention.

Referring now to FIG. 1, a diagrammatic illustration of one preferred embodiment of a system 10 for estimating NOx content of exhaust gas produced by an internal combustion engine, in accordance with the present invention, is shown. System 10 includes an internal combustion engine 12 having an intake manifold 14 fluidly coupled to an outlet of a compressor 16 of a turbocharger 18 via an intake conduit 20, wherein the compressor 16 includes a compressor inlet coupled to an intake conduit 22 for receiving fresh air therefrom. Optionally, as shown in phantom in FIG. 1, system 10 may include an intake air cooler 24 of known construction disposed in line with intake conduit 20 between the turbocharger compressor 16 and the intake manifold 14. The turbocharger compressor 16 is mechanically coupled to a turbocharger turbine 26 via a drive shaft 28, wherein turbine 26 includes a turbine inlet fluidly coupled to an exhaust manifold 30 of engine 12 via an exhaust conduit 32, and further includes a turbine outlet fluidly coupled to ambient via an exhaust conduit 34. An EGR valve 38 is disposed in-line with an EGR conduit 36 fluidly coupled at one end to the intake conduit 20 and an opposite end to the exhaust conduit 32, and an EGR cooler 40 of known construction may optionally be disposed in-line with EGR conduit 36 between EGR valve 38 and intake conduit 20 as shown in phantom in FIG. 1.

System 10 includes a control computer 42 that is preferably microprocessor-based and is generally operable to control and manage the overall operation of engine 12. Control computer 42 includes a memory unit 45 as well as a number of inputs and outputs for interfacing with various sensors and systems coupled to engine 12. Control computer 42, in one embodiment, may be a known control unit sometimes referred to as an electronic or engine control module (ECM), electronic or engine control unit (ECU) or the like, or may alternatively be a control circuit capable of operation as will be described hereinafter. In any case, control computer 42 preferably includes one or more control algorithms, as will be described in greater detail hereinafter, for controlling an operating condition of engine 12.

Control computer 42 includes a number of inputs for receiving signals from various sensors or sensing systems associated with system 10. For example, system 10 includes an engine speed sensor 44 electrically connected to an engine speed input, ES, of control computer 42 via signal path 46. Engine speed sensor 44 is operable to sense rotational speed of the engine 12 and produce an engine speed signal on signal path 46 indicative of engine rotational speed. In one embodiment, sensor 44 is a Hall effect sensor operable to determine engine speed by sensing passage thereby of a number of equi-angularly spaced teeth formed on a gear or tone wheel. Alternatively, engine speed sensor 44 may be any other known sensor operable as just described including, but not limited to, a variable reluctance sensor or the like.

System 10 further includes an intake manifold temperature sensor 48 disposed in fluid communication with the intake manifold 14 of engine 12, and electrically connected to an intake manifold temperature input (IMT) control computer 42 via signal path 50. Intake manifold temperature sensor 48 may be of known construction, and is operable to produce a temperature signal on signal path 50 indicative of the temperature of air charge flowing into the intake manifold 14, wherein the air charge flowing into the intake manifold 14 is generally made up of fresh air supplied by the turbocharger compressor 16 combined with recirculated exhaust gas supplied by EGR valve 38.

System 10 further includes an intake manifold pressure sensor 52 disposed in fluid communication with intake manifold 14 and electrically connected to an intake manifold pressure input (IMP) of control computer 42 via signal path 54. Alternatively, pressure sensor 52 may be disposed in fluid communication with intake conduit 20. In any case, pressure sensor 52 may be of known construction, and is operable to produce a pressure signal on signal path 54 indicative of air pressure within intake conduit 20 and intake manifold 14.

System 10 further includes a differential pressure sensor, or ΔP sensor, 56 fluidly coupled at one end to EGR conduit 36 adjacent to an exhaust gas inlet of EGR valve 38 via conduit 60, and fluidly coupled at its opposite end to EGR conduit 36 adjacent to an exhaust gas outlet of EGR valve 38 via conduit 58. Alternatively, the ΔP sensor 56 may be coupled across another flow restriction mechanism disposed in-line with EGR conduit 36. In either case, the ΔP sensor 56 may be of known construction and is electrically connected to a ΔP input of control computer 42 via signal path 62. The ΔP sensor 62 is operable to provide a differential pressure signal on signal path 62 indicative of the pressure differential across EGR valve 38 or other flow restriction mechanism disposed in-line with EGR conduit 36.

Optionally, as shown in phantom in FIG. 1, system 10 may include a first mass air flow sensor 76 disposed in fluid communication with intake manifold 14 and electrically connected to a charge mass flow rate input (CMF) of control computer 42 via signal path 78. Alternatively, mass air flow sensor 76 may be disposed in fluid communication with intake conduit 20 downstream of the EGR conduit 36. In any case, mass airflow sensor 76 may be of known construction, and is operable to produce a mass airflow signal on signal path 54 indicative of the mass flow rate of air charge entering intake manifold 14, wherein the air charge flowing into the intake manifold 14 is generally made up of fresh air supplied by the turbocharger compressor 16 combined with recirculated exhaust gas supplied by EGR valve 38.

System 10 may further optionally include an engine exhaust temperature sensor 80 disposed in fluid communication with exhaust conduit 32 and electrically connected to an engine exhaust temperature input (ET) of control computer 42 via signal path 82, as shown in phantom in FIG. 1. Alternatively, temperature sensor 80 may be disposed in fluid communication with intake manifold 14. In any case, engine exhaust temperature sensor 80 may be of known construction, and is operable to produce a temperature signal on signal path 82 indicative of the temperature of exhaust gas produced by engine 12.

System 10 may further optionally include a mass flow sensor 84 disposed in fluid communication with EGR conduit 36 and electrically connected to an EGR mass flow rate input (EGRMF) of control computer 42 via signal path 84, as shown in phantom in FIG. 1. Sensor 84 may be located on either side of the EGR valve 38, and in any case, mass flow sensor 84 may be of known construction and operable to produce a mass flow signal on signal path 86 indicative of the mass flow rate of recirculated exhaust gas flowing through the EGR conduit 36.

System 10 may further optionally include another mass airflow sensor 88 disposed in fluid communication with intake conduit 22 EGR and electrically connected to a fresh air mass flow rate input (FAMF) of control computer 42 via signal path 90, as shown in phantom in FIG. 1. Alternatively, sensor 88 may be disposed in fluid communication with intake conduit 20 upstream of the junction of intake conduit 20 with the EGR conduit 36. In either case, sensor 88 is operable to produce a mass airflow signal on signal path 90 indicative of the mass flow rate of fresh air flowing through intake conduits 20 and 22.

Control computer 42 also includes a number of outputs for controlling one or more engine functions associated with system 10. For example, EGR valve 38 includes an EGR valve actuator 64 that is electrically connected to an EGR valve control output (EGRC) of control computer 42 via signal path 66. Control computer 42 is operable, as is known in the art, to produce an EGR valve control signal on signal path 66 to thereby control the position of EGR valve 38 relative to a reference position. Control computer 42 is accordingly operable to control EGR valve 38 to selectively provide a flow of recirculated exhaust gas from exhaust manifold 30 to intake manifold 14. EGR valve 38 further includes an EGR valve actuator position sensor 68 electrically connected to an EGR position input (EGRP) of control computer 42 via signal path 70. Position sensor 68 may be of known construction and operable to produce a position signal on signal path 70 indicative of the position of the EGR valve actuator 64 relative to a reference position.

System 10 further includes a fuel system 72 electrically connected to a fuel command output (FC) of control computer 42 via signal path 74. Fuel system 72 is responsive to fueling commands produced by control computer 42 on signal path 74 to supply fuel to engine 12, and control computer 42 is operable to produce such fueling commands in a manner well-known in the art.

Figure 2:
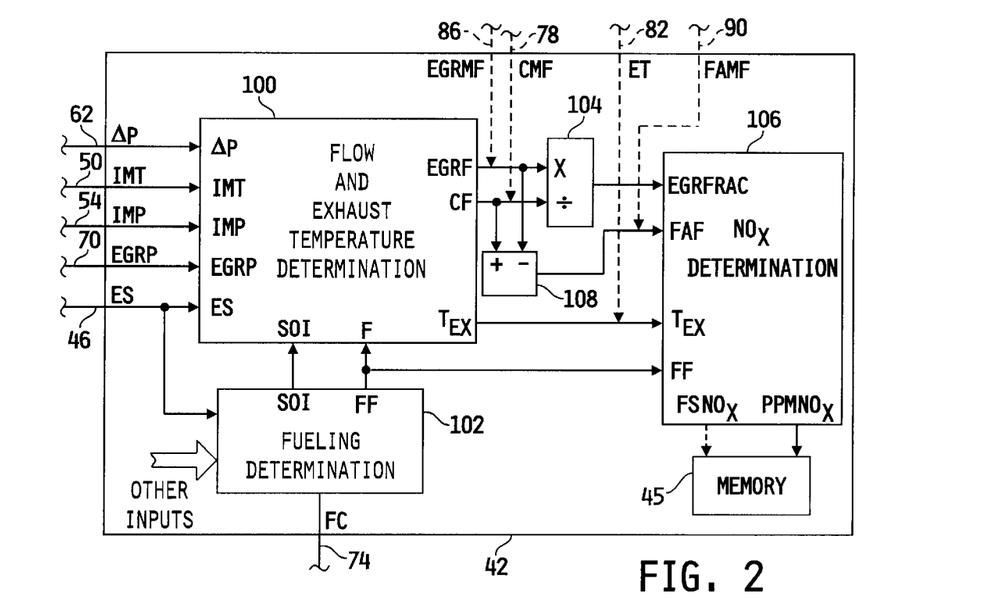
FIG. 2 is a block diagram illustrating one preferred configuration of the control computer of FIG. 1 for estimating NOx production, in accordance with the present invention.

Referring now to FIG. 2, a block diagram is shown illustrating one preferred embodiment of a portion of the control computer 42 of FIG. 1, configured to estimate NOx production, in accordance with the present invention. Control computer 42 includes a fueling determination block 102 receiving the engine speed signal (ES) from engine speed sensor 44 via signal path 46, as well as a number of additional input signals. Block 102 is responsive to the ES signal on signal path 46 as well as one or more of the additional signals to compute a fueling command (FC) as a function of a mass fuel flow rate (fuel flow) value, FF, and of a start-of-fuel injection timing value, SOI, in accordance with techniques well-known in the art. The fueling command, FC, is then provided on signal path 74 by block 102, and the fueling system 72 is responsive to the fueling commands produced by block 102 to supply fuel to engine 12.

Control computer 42 further includes a flow and exhaust temperature determination block 100 receiving the start-of-injection and fuel flow values, SOI and FF respectively, at inputs SOI and F respectively. Additionally, block 100 receives as inputs the pressure differential signal, ΔP, on signal path 62, the intake manifold temperature signal, IMT, on signal path 50, the intake manifold pressure signal, IMP, on signal path 54, the EGR valve position signal, EGRP, on signal path 70 and the engine speed signal, ES, on signal path 46. Block 100 is operable, as will be described in greater detail with respect to FIG. 3, to estimate, as a function of various combinations of the input signals to block 100, a charge flow value, CF, corresponding to the mass flow rate of air charge (combination of fresh air supplied by compressor 16 and recirculated exhaust gas provided by EGR valve 38) entering the intake manifold 14, an EGR flow value, EGRF, corresponding to the mass flow rate of recirculated exhaust gas flowing through EGR conduit 36, and an engine exhaust temperature value, $T_{EX}$, corresponding to the temperature of exhaust gas produced by engine 12.

Control computer 42 further includes an arithmetic block 104 having a multiplication input receiving the EGR flow value, EGRF, from block 100, and a division input receiving the charge flow value, CF, from block 100. Alternatively, as shown in phantom in FIG. 1, arithmetic block 104 may receive the EGR mass flow rate information directly from mass flow sensor 84 via signal path 86, and/or may also receive the charge mass flow rate information directly from mass flow sensor 76 via signal path 78. In such embodiments, the portions of flow and exhaust temperature determination block 100 estimating the EGR flow value, EGRF, and/or the charge flow value, CF, may be omitted. In any case, arithmetic block 104 is operable to produce as an output thereof a ratio of EGR mass flow rate and charge flow mass flow rate, which corresponds to the fraction of recirculated exhaust gas contained in the total air charge supplied to the intake manifold 14, or EGR fraction (EGRFRAC). Those skilled in the art will recognize that, for purposes of the present invention, other known techniques may be used to determine the EGR fraction value, EGRFRAC. For example, system 10 may include a CO or $CO_2$ sensor of known construction and fluidly coupled to intake manifold 14 or intake conduit 20 downstream of the junction of intake conduit 20 with the EGR conduit 36. Such a CO or $CO_2$ sensor will be operable to produce a signal indicative of CO or $CO_2$ level of air charge entering the intake manifold 14, and such information may be used to determine the EGR fraction value, EGRFRAC, using known equations.

Control computer 42 further includes an arithmetic block 108 having an addition input receiving the EGR flow value, EGRF, from block 100, and a subtraction input receiving the charge flow value, CF, from block 100. Alternatively, as shown in phantom in FIG. 1, arithmetic block 108 may receive the EGR mass flow rate information directly from mass flow sensor 84 via signal path 86, and/or may also receive the charge mass flow rate information directly from mass flow sensor 76 via signal path 78. In any case, arithmetic block 108 is operable to produce as an output thereof a fresh air mass flow rate value (FAF) as a difference between the charge flow value, CF, and the EGR flow value, EGRF. The fresh air mass flow rate value, FAG, corresponds to the mass flow rate of fresh air flowing through intake conduits 20 and 22.

Control computer 42 further includes a NOx determination block 106 receiving as inputs the EGR fraction value, EGRFRAC, produced by arithmetic block 104, the fresh air mass flow rate value, FAF, produced by block 108 (or the fresh air mass flow rate signal, FAMF, provided by mass airflow sensor 88), the fuel flow rate signal, FF, produced by the fueling determination block 102, and the engine exhaust temperature value, $T_{EX}$, produced by block 100. Alternatively, as shown in phantom in FIG. 1, the NOx determination block 106 may receive the engine exhaust temperature information directly from exhaust gas temperature sensor 80 via signal path 82. In such embodiments, the portion of flow and exhaust temperature determination block 100 estimating the engine exhaust temperature, $T_{EX}$, may be omitted. In any case, the NOx determination block 106 is operable to process the input signals thereto and estimate a so-called "emissions index", FSNOx, corresponding to a fuel rate normalized, mass-based NOx concentration (e.g., in grams of NOx per kilograms of fuel) of the exhaust gas produced by engine 12, and to estimate a NOx content by volume (e.g., in parts-per-million, or ppm), PPMNOx, in a manner that will be described in detail hereinafter with respect to FIGS. 4 and 5.

In one embodiment, the NOx determination block 106 is operable to store, in some form, the PPMNOx value and optionally the FSNOx value, in memory unit 45. In one implementation, for example, memory unit 45 includes a buffer of predefined sample length, N, that is operable to store therein the most recent N samples. In this case, the effective NOx values PPMNOx and/or FSNOx may be represented as running averages of the information contained in the corresponding buffers. Those skilled in the art will recognize other known strategies of varying complexity for storing PPMNOx and/or FSNOx values, and/or for computing effective, average or running average PPMNOx and/or FSNOx values, and any such strategies are intended to fall within the scope of the present invention.

Figure 3:
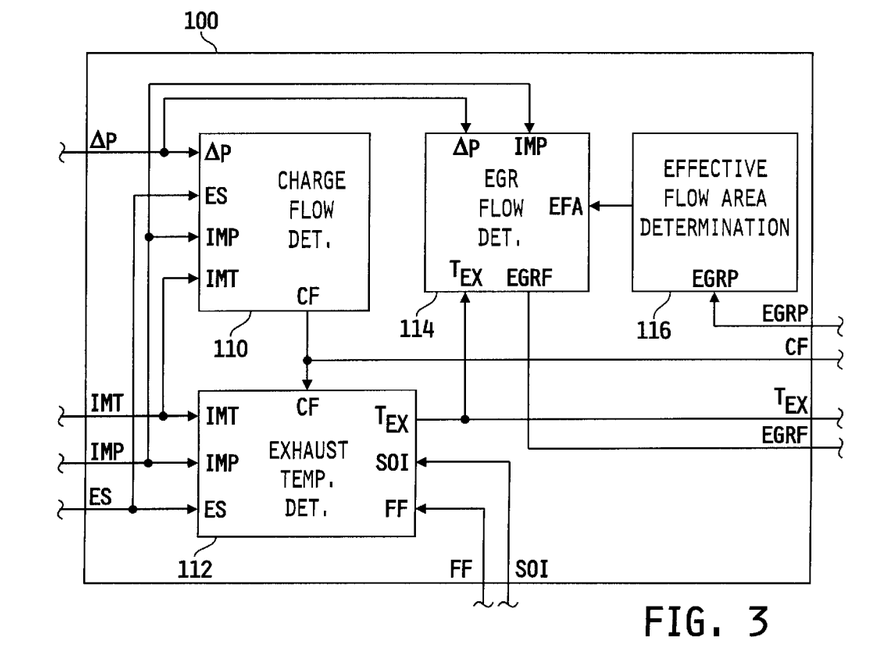
FIG. 3 is a block diagram illustrating one preferred embodiment of the flow and exhaust temperature determination block of FIG. 2.

Referring now to FIG. 3, a block diagram illustrating one preferred embodiment of the flow and exhaust temperature determination block 100 of FIG. 2 is shown. Block 100 includes a charge flow determination block 110 receiving as inputs the pressure differential signal, ΔP, the engine speed signal, ES, the intake manifold pressure signal, IMP, and the intake manifold temperature signal, IMT, and producing the charge flow value, CF, corresponding to an estimate of the mass flow rate of air charge entering the intake manifold 14, as a function of the various input signals to block 110.

In one preferred embodiment, the charge flow determination block 110 is operable to compute an estimate of charge flow, CF, by first estimating the volumetric efficiency ($\eta_V$) of the charge intake system, and then computing CF as a function of $\eta_V$ using a conventional speed/density equation. Any known technique for estimating $\eta_V$ may be used, and in one preferred embodiment of block 110, $\eta_V$ is computed according to a known Taylor mach number-based volumetric efficiency equation given as:

$$\eta_V = A_1 * \{(Bore/D)^2 * (stroke*ES)^B / sqrt(\gamma*R*IMT) * [(1+EP/IMP)+A_2]\} + A_3 \qquad (1),$$

where,

A1, A$_2$, A$_3$ and B are all calibratable parameters preferably fit to the volumetric efficiency equation based on mapped engine data,
Bore is the intake valve bore length,
D is the intake valve diameter,
stroke is the piston stroke length, wherein Bore, D and stroke are dependent upon engine geometry,
$\gamma$ and R are known constants (e.g., $\gamma R=387.414$ J/kg/deg K),
ES is engine speed,
IMP is the intake manifold pressure,
EP is the exhaust pressure, where EP=IMP+$\Delta$P, and
IMT=intake manifold temperature.

With the volumetric efficiency value $\eta_V$ estimated according to the foregoing equation, the charge flow value, CF, is preferably computed according to the equation:

$$CF = \eta_V * V_{DIS} * ES * IMP / (2*R*IMT) \qquad (2),$$

where, $\eta_V$ is the estimated volumetric efficiency,
V$_{DIS}$ is engine displacement and is generally dependent upon engine geometry,
ES is engine speed,
IMP is the intake manifold pressure,
R is a known gas constant (e.g., R=53.3 ft-lbf/lbm °R or R=287 J/Kg °K), and
IMT is the intake manifold temperature.

Block 100 further includes an exhaust temperature determination block 112 receiving as inputs the engine speed signal, ES, the intake manifold pressure signal, IMP, and the intake manifold temperature signal, IMT, as well as the charge flow value, CF, produced by block 110 (or the charge mass flow rate value produced by sensor 76) and the SOI and FF values produced by the fueling determination block 102, and producing the engine exhaust temperature value, T$_{EX}$, corresponding to an estimate of the temperature of exhaust gas produced by engine 12. In one embodiment, the engine exhaust temperature determination block 112 is operable to compute an estimate of the engine exhaust temperature, T$_{EX}$, according to the model:

$$T_{EX} = IMT + [(A*ES) + (B*IMP) + (C*SOI) + D)][(LHV*FF)/CF] \qquad (3),$$

wherein A, B, C, and D are model constants, and LHV is a lower heating value of the fuel which is a known constant depending upon the type of fuel used by engine 12. In an alternate embodiment, the engine exhaust temperature determination block 112 is operable to compute the engine exhaust temperature estimate, T$_{EX}$, according to the model:

$$T_{EX} = IMT + A + (B*SOI) + C/(CF/FF) + (D*SOI)/ES + E/[(ES*CF)/FF] \qquad (4),$$

wherein A, B, C, D and E are model constants. Further details relating to either of the engine exhaust temperature models represented by equations (3) and (4) are provided in co-pending U.S. patent application Ser. No. 09/773,654, entitled SYSTEM FOR ESTIMATING ENGINE EXHAUST TEMPERATURE, which is assigned to the assignee of the present invention, and the disclosure of which is incorporated herein by reference.

Block 100 further includes an EGR flow determination block 114 receiving as inputs the pressure differential signal, $\Delta$P, the intake manifold pressure signal, IMP, the engine exhaust temperature value, T$_{EX}$, produced by block 112 (or the exhaust gas temperature signal provided by sensor 80), and an effective flow area value, EFA, produced by an effective flow area determination block 116. In one embodiment, the effective flow area determination block 116 receives as an input the EGR valve position signal, EGRP, and produces an effective flow area output, EFA, corresponding to the effective flow area of the EGR conduit 36, wherein EFA in the embodiment shown in FIG. 1 is defined by the cross-sectional flow area of EGR valve 38. Block 116 may include one or more equations, graphs and/or tables relating EGR position to effective flow area values, EFA.

In any case, the EGR flow determination block 114 is operable to estimate the EGR flow value, EGRF, as a function of $\Delta$P, IMP, T$_{EX}$ and EFA. In one embodiment, block 114 is operable to estimate EGRF according to the model:

$$EGRF = EFA * sqrt[|(2*\Delta P*IMP)/(R*T_{EX})|] \qquad (5),$$

where R is a known gas constant as identified hereinabove. It is to be understood that equation (5), as well as the computation of the EGR fraction value, EGRFRAC, described hereinabove represent simplified approximations of these two parameters based on assumptions of constant exhaust gas temperature through the EGR valve 38 and steady state flow of exhaust gas through EGR valve 38, and neglecting effects resulting from a variable time delay between the passage of recirculated exhaust gas through EGR valve 38 and arrival of the corresponding EGR fraction in the engine cylinders. Further details relating to strategies for addressing such assumptions are described in co-pending U.S. patent application Ser. No. 09/774,897, entitled SYSTEM AND METHOD FOR ESTIMATING EGR MASS FLOW AND EGR FRACTION, which is assigned to the assignee of the present invention, and the disclosure of which is incorporated herein by reference.

Figure 4:
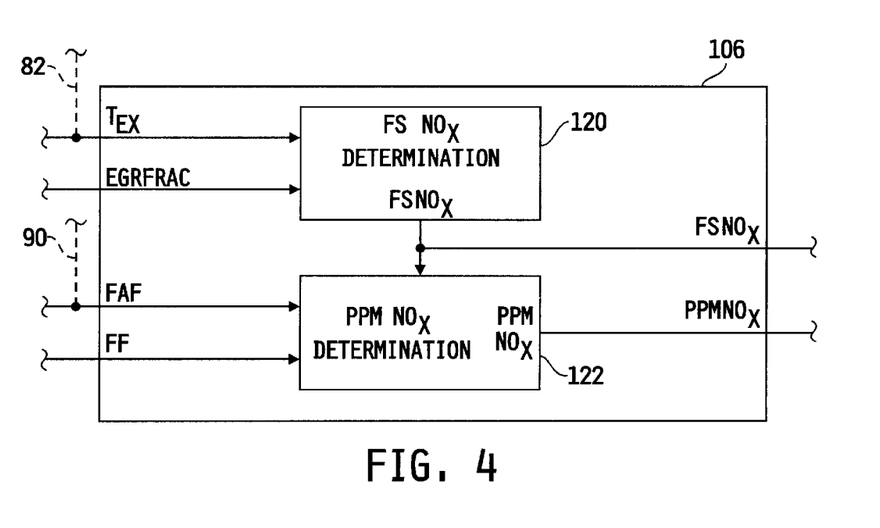
FIG. 4 is a block diagram illustrating one preferred embodiment of the NOx determination block of FIG. 2, in accordance with the present invention.

Referring now to FIG. 4, a block diagram illustrating one preferred embodiment of the NOx determination block 106 of FIG. 2, in accordance with the present invention, is shown. Block 106 includes a FSNOx determination block 120 receiving as inputs the engine exhaust temperature value, T$_{EX}$, provided by the exhaust temperature determination block 112 (or by sensor 80) and the EGR fraction value, EGRFRAC, provided by arithmetic block 104, and determines a FSNOx value as a function thereof, wherein FSNOx corresponds to a fuel rate normalized, mass-based NOx concentration (e.g., in grams of NOx per kilograms of fuel) of the exhaust gas produced by engine 12. Block 106 further includes a PPMNOx determination block 122 receiving as inputs the fresh air mass flow rate value, FAF, provided by arithmetic block 108 (or by the mass airflow sensor 88), the fuel flow value, FF, provided by the fueling determination block 102 and the FSNOx value produced by the FSNOx determination block 120, and determines a PPMNOx value as a function thereof, wherein PPMNOx corresponds to NOx content by volume of the exhaust gas produced by engine 12. In one embodiment, FSNOx is determined in units of grams of NOx per kilograms of fuel and PPMNOx is determined in units of parts-per-million (PPM), although the present invention contemplates determining such parameters in any suitable units.

Figure 5:
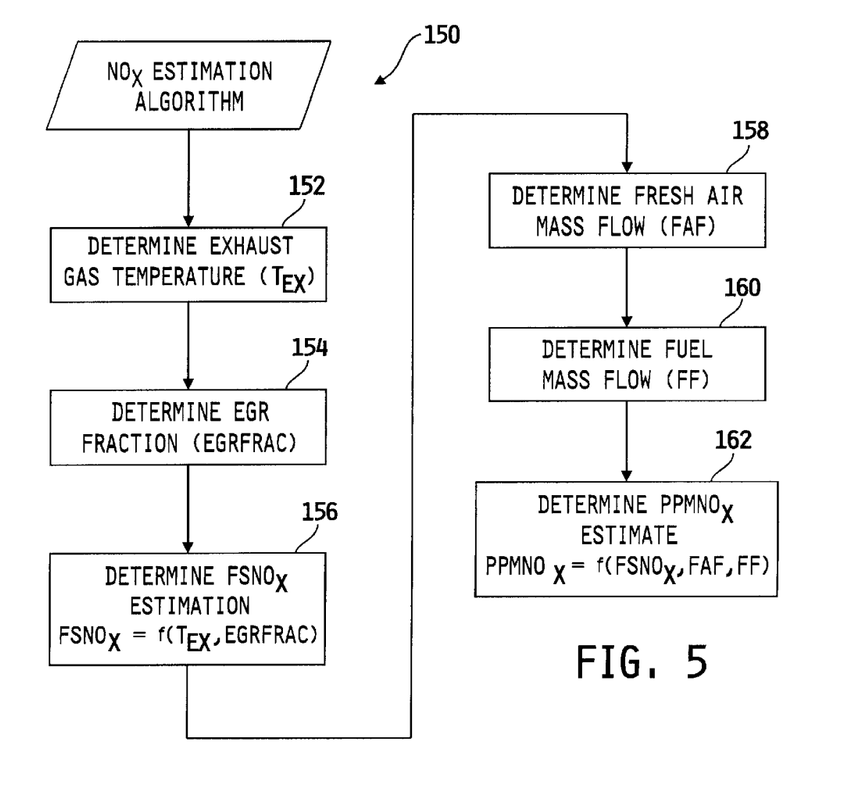
FIG. 5 is a flowchart illustrating one preferred embodiment of a software algorithm for estimating NOx production, in accordance with the present invention.

Referring now to FIG. 5, a flowchart is shown illustrating one preferred embodiment of a software algorithm 150 for estimating FSNOx and PPMNOx, in accordance with the present invention. In one embodiment, algorithm 150 is resident within block 106, wherein FSNOx determination block 120 is operable to execute the first three steps of algorithm 150 while the PPMNOx determination block 122 is operable to execute the remaining three steps of algorithm 150. In any case, control computer 42 is operable to execute algorithm 150 which begins at step 152 where control computer 42 is operable to determine the exhaust gas temperature, $T_{EX}$. In one embodiment, control computer 42 is operable to execute step 152 by estimating $T_{EX}$ via block 112, although the present invention contemplates that control computer 42 may alternatively execute step 152 by monitoring the temperature signal on signal path 82. Algorithm execution advances from step 152 to step 154 where control computer 42 is operable to determine the EGR fraction, EGRFRAC. In one embodiment, control computer 42 is operable to execute step 154 by computing EGRFRAC as a ratio of the EGR flow value, EGRF, (or the EGR mass flow rate EGRMF) and the charge flow value, CF, (or the charge mass flow rate CMF), wherein EGRF, CF, EGRMF and/or CMF may be generated using any of the techniques described hereinabove.

Following step 154, algorithm 150 advances to step 156 where control computer 42 is operable to compute FSNOx as a function of $T_{EX}$ and EGRFRAC according to the model:

$$FSNOx = (A * T_{EX}^2 + B * T_{EX} + C) * (D * EGRFRAC^2 + E * EGRFRAC + F) \quad (6),$$

wherein A, B, C, D, E and F are model constants. In one specific implementation, A=−7.29035E−06, B=−1.11227E−01, C=2.26886E+02, D=2.51859, E=−1.85085 and F=3.95463E−01, although the present invention contemplates other values for these constants.

Algorithm 150 advances from step 156 to step 158 where control computer 42 is operable to determine the fresh air mass flow rate value, FAF, (or the fresh air mass flow rate value FAMF) using any of the techniques described hereinabove. Thereafter at step 160, control computer 42 is operable to determine the fuel flow value, FF, corresponding to the fuel mass flow rate value produced by the fueling determination block 102. Thereafter at step 162, control computer 42 is operable to compute PPMNOx as a function of FSNOx, FAF and FF according to the model:

$$PPMNOx = [FF/(FF+FAF)] * 1000 * FSNOx * MWNOx * MWEX/DtoW \quad (7),$$

where,

MWNOx is the molecular weight of NOx (e.g., 46.01),
MWEX is the molecular weight of engine exhaust gas (e.g., 28.8), and
DtoW is a dry-to-wet ratio computed as a function of a conventional air-to-fuel ratio value, AFR, computed by control computer 42. In one embodiment, DtoW= $A*AFR^2+B*AFR+C$. In one specific implementation, A=−0.00007094, B=0.006325 and C=0.8105, although the present invention contemplates other values for A, B and C.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected. For example, while FSNOx has been described as being determined as a function of $T_{EX}$ and EGRFRAC, it is believed that the accuracy of the model of equation (6) may be improved by including in equation (6) a function of SOI. It is to be understood, however, that such modifications are intended to fall within the scope of the present invention.

What is claimed is:

1. System for estimating NOx content of exhaust gas produced by an internal combustion engine, comprising:
    means for determining exhaust temperature corresponding to temperature of exhaust gas produced by the engine;
    an exhaust gas recirculation structure configured to controllably route exhaust gas produced by the engine to an intake manifold of the engine;
    means for determining an EGR fraction corresponding to a fractional amount of recirculated exhaust gas present in an air charge supplied to the engine; and
    a control computer estimating a fuel rate normalized, mass-based NOx concentration of the exhaust gas produced by the engine as a function of said exhaust temperature and said EGR fraction.

2. The system of claim 1 wherein said control computer is operable to estimate said fuel rate normalized, mass-based NOx concentration of the exhaust gas produced by the engine according to the function:

$$FSNOx = (A*T_{EX}^2 + B*T_{EX} + C)*(D*EGRFRAC^2 + E*EGRFRAC + F),$$

wherein FSNOx is said fuel rate normalized, mass-based NOx concentration of the exhaust gas produced by the engine, $T_{EX}$ is said exhaust gas temperature, EGRFRAC is said EGR fraction, and A, B, C, D, E and F are constants.

3. The system of claim 1 further including a fuel system responsive to a fueling signal to supply fuel to the engine;
    and wherein said means for determining exhaust temperature corresponding to temperature of exhaust gas produced by the engine includes:
    a temperature sensor producing a temperature signal indicative of air temperature within said intake manifold;
    a pressure sensor producing a pressure signal indicative of air pressure within said intake manifold;
    an engine speed sensor producing a speed signal indicative of rotational speed of the engine; and
    means for determining a charge mass flow rate corresponding to a mass flow rate of said air charge supplied to the engine;
    and wherein said control computer is operable to produce said fueling signal as a function of a fuel mass flow rate and a start-of-injection value, said control computer determining said exhaust temperature as a function of said temperature signal, said pressure signal, said speed signal, said charge mass flow rate, said fuel mass flow rate and said start-of-injection value.

4. The system of claim 1 wherein said exhaust gas recirculation structure includes a flow restriction mechanism having an inlet fluidly coupled to an exhaust manifold of the engine and an outlet fluidly coupled to said intake manifold.

5. The system of claim 4 wherein said means for determining an EGR fraction corresponding to a fractional amount of recirculated exhaust gas present in an air charge supplied to the engine includes:
    a first pressure sensor producing a first pressure signal indicative of air pressure within said intake manifold;

a second pressure sensor producing a second pressure signal indicative of a pressure differential across said flow restriction mechanism; and means for determining an effective flow area of said exhaust gas through said exhaust gas recirculation structure;

and wherein said control computer is operable to determine said EGR fraction as a function of said first pressure signal, said second pressure signal, said effective flow area and said exhaust temperature.

6. The system of claim 1 further including:

means for determining a fresh air mass flow rate corresponding to a mass flow rate of fresh air supplied to the engine; and a fuel system responsive to a fueling signal to supply fuel to the engine;

wherein said control computer is operable to produce said fueling signal as a function of a fuel mass flow rate, said control computer estimating a NOx content by volume of exhaust gas produced by the engine as a function of said fuel rate normalized, mass-based NOx concentration of the exhaust gas produced by the engine, said fresh air mass flow rate and said fuel mass flow rate.

7. The system of claim 6 wherein said control computer is operable to estimate said NOx content by volume of exhaust gas produced by the engine in units of parts-per-million.

8. The system of claim 6 wherein said control computer is operable to estimate said NOx content by volume of exhaust gas according to the function:

$$NOx_{vol} = A * FSNOx * B * [FF/(FF+FAF)],$$

wherein $NOx_{vol}$ is said NOx content by volume of exhaust gas produced by the engine, FSNOx is said fuel rate normalized, mass-based NOx concentration of the exhaust gas produced by the engine, FF is said fuel mass flow rate, FAF is said fresh air mass flow rate, A is a constant, and B is a function of an air-to-fuel ratio value.

9. The system of claim 6 wherein said means for determining exhaust temperature corresponding to temperature of exhaust gas produced by the engine includes:

a temperature sensor producing a temperature signal indicative of air temperature within said intake manifold;

a pressure sensor producing a pressure signal indicative of air pressure within said intake manifold; and an engine speed sensor producing a speed signal indicative of rotational speed of the engine;

and wherein said control computer is operable to produce said fueling signal further as a function of a start-of-injection value, said control computer determining said exhaust temperature as a function of said temperature signal, said pressure signal, said speed signal, said charge mass flow rate, said fuel mass flow rate and said start-of-injection value.

10. The system of claim 6 wherein said exhaust gas recirculation structure includes a flow restriction mechanism having an inlet fluidly coupled to an exhaust manifold of the engine and an outlet fluidly coupled to said intake manifold.

11. The system of claim 10 wherein said means for determining an EGR fraction corresponding to a fractional amount of recirculated exhaust gas present in an air charge supplied to the engine includes:

a first pressure sensor producing a first pressure signal indicative of air pressure within said intake manifold;

a second pressure sensor producing a second pressure signal indicative of a pressure differential across said flow restriction mechanism; and means for determining an effective flow area of said exhaust gas through said exhaust gas recirculation structure;

and wherein said control computer is operable to determine said EGR fraction as a function of said first pressure signal, said second pressure signal, said effective flow area and said exhaust temperature.

12. A method of estimating NOx content of exhaust gas produced by an internal combustion engine, the method comprising the steps of:

determining an exhaust temperature corresponding to temperature of exhaust gas produced by the engine;

determining an EGR fraction corresponding to a fractional amount of recirculated exhaust gas present in an air charge supplied to the engine; and estimating a fuel rate normalized, mass-based NOx concentration of the exhaust gas produced by the engine as a function of said exhaust temperature and said EGR fraction.

13. The method of claim 12 wherein the estimating step includes estimating said fuel rate normalized, mass-based NOx concentration of the exhaust gas produced by the engine according to the function:

$$FSNOx = (A*T_{EX}^2 + B*T_{EX} + C) * (D*EGRFRAC^2 + E*EGRFRAC + F),$$

wherein $NOx_{wt}$ is said NOx content by weight of exhaust gas produced by the engine, $T_{EX}$ is said exhaust gas temperature, EGRFRAC is said EGR fraction, and A, B, C, D, E and F are constants.

14. The method of claim 12 wherein the step of determining an EGR fraction includes:

determining a first pressure indicative of air pressure within an intake manifold of the engine;

determining a second pressure indicative of a pressure differential across a flow restriction mechanism disposed between an exhaust manifold of the engine and said intake manifold;

determining an effective flow area of said flow restriction mechanism; and estimating said EGR fraction as a function of said first pressure, said second pressure, said effective flow area and said exhaust temperature.

15. The method of claim 12 wherein the step of determining exhaust temperature includes:

determining an intake temperature indicative of air temperature within an intake manifold of the engine;

determining an intake pressure indicative of air pressure within said intake manifold;

determining an engine speed indicative of rotational speed of the engine;

determining a charge mass flow rate corresponding to a mass flow rate of air charge supplied to the engine;

determining a fuel mass flow rate corresponding to a mass flow rate of fuel supplied to the engine;

determining a start-of-injection value corresponding to a start of injection of fuel into the engine; and estimating said exhaust temperature as a function of said intake temperature, said intake pressure, said engine speed, said charge mass flow rate, said fuel mass flow rate and said start-of-injection value.

16. The method of claim 12 further including the steps of:

determining a fresh air mass flow rate corresponding to a mass flow rate of fresh air supplied to the engine;

determining a fuel mass flow rate corresponding to a mass flow rate of fuel supplied to the engine; and estimating a NOx content by volume of exhaust gas produced by the engine as a function of said fuel rate normalized, mass-based NOx concentration of the exhaust gas produced by the engine, said fresh air mass flow rate and said fuel mass flow rate.

17. The method of claim 16 wherein the step of estimating a NOx content by volume of exhaust gas includes estimating said NOx content by volume of exhaust gas produced by the engine in units of parts-per-million.

18. The method of claim 16 wherein the step of estimating a NOx content by volume of exhaust gas includes estimating said NOx content by volume of exhaust gas according to the function:

$$NOx_{vol} = A * FSNOx * B * [FF/(FF+FAF)],$$

wherein $NOx_{vol}$ is said NOx content by volume of exhaust gas produced by the engine, $NOx_{wt}$ is said fuel rate normalized, mass-based NOx concentration of the exhaust gas produced by the engine, FF is said fuel mass flow rate, FAF is said fresh air mass flow rate, A is a constant and B is a function of an air-to-fuel ratio value.

19. The method of claim 16 wherein the step of determining an EGR fraction includes:

determining a first pressure indicative of air pressure within an intake manifold of the engine;

determining a second pressure indicative of a pressure differential across a flow restriction mechanism disposed between an exhaust manifold of the engine and said intake manifold;

determining an effective flow area of said flow restriction mechanism; and estimating said EGR fraction as a function of said first pressure, said second pressure, said effective flow area and said exhaust temperature.

20. The method of claim 16 wherein the step of determining exhaust temperature includes:

determining an intake temperature indicative of air temperature within an intake manifold of the engine;

determining an intake pressure indicative of air pressure within said intake manifold;

determining an engine speed indicative of rotational speed of the engine;

determining a start-of-injection value corresponding to a start of injection of fuel into the engine; and estimating said exhaust temperature as a function of said intake temperature, said intake pressure, said engine speed, said charge mass flow rate, said fuel mass flow rate and said start-of-injection value.

* * * * *